(12) United States Patent
Goyal et al.

(10) Patent No.: US 12,050,905 B2
(45) Date of Patent: Jul. 30, 2024

(54) VIDEO-BASED PROGRESS TRACKER FOR MOBILE APPLICATION DEVELOPMENT

(71) Applicant: Microsoft Technology Licensing, LLC, Redmond, WA (US)

(72) Inventors: Vishal Goyal, New Delhi (IN); Nishith Anand, Lucknow (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 17/840,529

(22) Filed: Jun. 14, 2022

(65) Prior Publication Data

US 2023/0401057 A1    Dec. 14, 2023

(51) Int. Cl.
 *G06F 8/71* (2018.01)
 *G06F 8/73* (2018.01)

(52) U.S. Cl.
 CPC . *G06F 8/71* (2013.01); *G06F 8/73* (2013.01)

(58) Field of Classification Search
 None
 See application file for complete search history.

(56) References Cited

U.S. PATENT DOCUMENTS

| | | | | |
|---|---|---|---|---|
| 8,341,600 | B2 * | 12/2012 | Sutherland | G06Q 10/10 717/125 |
| 8,448,067 | B2 | 5/2013 | Cerny et al. | |
| 8,656,293 | B1 * | 2/2014 | Webster | H04M 1/72427 715/769 |
| 8,984,485 | B2 | 3/2015 | Elshishiny et al. | |
| 9,135,591 | B1 * | 9/2015 | Nicol | G06Q 10/06 |
| 9,557,968 | B1 * | 1/2017 | Smith | G06F 8/75 |
| 9,600,273 | B2 * | 3/2017 | Neubeck | G06F 8/71 |
| 9,654,843 | B2 | 5/2017 | Santoro et al. | |
| 10,152,466 | B2 * | 12/2018 | Naveh | G06F 8/71 |
| 10,235,166 | B1 | 3/2019 | Barnard et al. | |
| 10,303,469 | B1 * | 5/2019 | Neatherway | G06F 8/71 |
| 10,482,261 | B2 | 11/2019 | Barouni Ebrahimi et al. | |
| 10,769,250 | B1 * | 9/2020 | Tautschnig | G06F 21/577 |
| 11,074,168 | B2 | 7/2021 | Fox et al. | |

(Continued)

OTHER PUBLICATIONS

Zanjani, M. B., "Impact Analysis of Change Requests on Source Code Based on Interaction and Commit Histories", In Proceedings of the 11th Working Conference on Mining Software Repositories, May 31, 2014, pp. 162-171.

(Continued)

*Primary Examiner* — Matthew J Brophy
(74) *Attorney, Agent, or Firm* — Schwegman Lundberg & Woessner, P.A.

(57) ABSTRACT

A method may include accessing a first code commit for a software application from a code repository, the code repository including a sequence of code commits for the software application; accessing a second code commit for the software application from the code repository, the second code commit occurring prior to the first code commit in the sequence of code commits for the software application; parsing the first code commit for differences across a plurality of dimensions from the second code commit; generating a video frame based on the differences; and appending the video frame to a video, the video including a plurality of frames tracking differences between code commits of the software application.

20 Claims, 10 Drawing Sheets

(56) References Cited

U.S. PATENT DOCUMENTS

| | | | | |
|---|---|---|---|---|
| 2009/0210860 A1* | 8/2009 | Sutherland | ............... | G06F 8/74 |
| | | | | 717/123 |
| 2011/0055702 A1* | 3/2011 | Jakobson | ................. | G06T 1/00 |
| | | | | 345/473 |
| 2014/0282400 A1* | 9/2014 | Moorthi | ............. | G06F 9/45558 |
| | | | | 717/122 |
| 2017/0269909 A1* | 9/2017 | Smith | ....................... | G06F 8/75 |
| 2018/0004507 A1* | 1/2018 | Aijaz | ................. | G06F 9/44505 |
| 2018/0090174 A1* | 3/2018 | Labarre | ........... | H04N 21/47205 |
| 2018/0217829 A1* | 8/2018 | Mowatt | ..................... | G06F 8/71 |
| 2018/0260312 A1* | 9/2018 | Strachan | ................... | G06F 8/71 |
| 2019/0079850 A1* | 3/2019 | Zhang | ................ | G06F 11/3636 |
| 2019/0114167 A1* | 4/2019 | Biddle | ............... | G06F 11/3668 |
| 2019/0205126 A1* | 7/2019 | Neatherway | .............. | G06F 8/77 |
| 2020/0225944 A1* | 7/2020 | Wright | .................. | G06Q 10/04 |
| 2021/0064364 A1* | 3/2021 | Culibrk | .................... | G06F 8/77 |

OTHER PUBLICATIONS

"Managing Code Change with Impact Analysis", Retrieved from: https://web.archive.org/web/20201109001238/https:/www.lattix.com/managing-code-change-with-impact-analysis/, Nov. 9, 2020, 5 Pages.

Santoni, et al., "LevelMerge: Collaborative Game Level Editing by Merging Labeled Graphs", In Journal of IEEE Computer Graphics and Applications, vol. 38, Issue 4, Jul. 3, 2018, pp. 71-83.

* cited by examiner

VIDEO-BASED PROGRESS TRACKER FOR MOBILE APPLICATION DEVELOPMENT

BACKGROUND

Like many aspects of computing, developing applications is increasingly performed in a client/server (e.g., cloud computing) environment. For example, large scale applications are often a collaborative effort between software developers, designers, managers, etc., that rely on a distributed version control system. A single code commit made to the code repository by any member of these groups may propagate across many dimensions of the application, such as altering user interface elements, load times, security compliance, etc.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
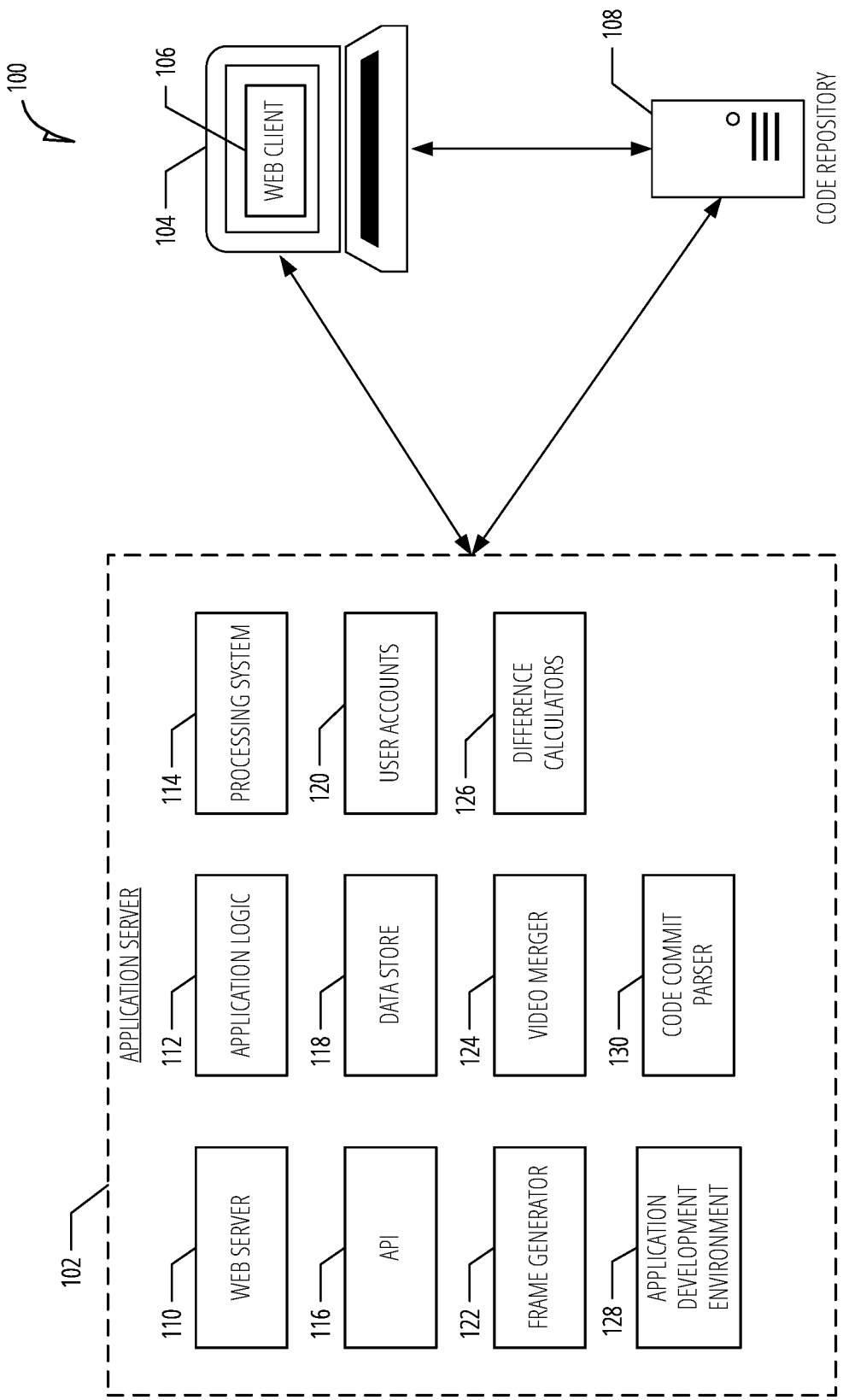
FIG. 1 is an illustration of components of a client device and an application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

As indicated in the Background, modem application development often relies on a team of individuals and a code repository (e.g., a distributed version control system). A single code may span multiple dimensions like user-interface changes, performance changes, test-coverage changes etc. Even though some code repository solutions have capabilities to handle code changes, code merges, as well as work-item tracking, they fail to provide a way to visualize the work done (via code commits) in a certain period. For example, consider person A wants to quickly visualize the work done by all the team members in the last two weeks." Person A could go through the list of code-commits and read each of their descriptions and keep manual notes, but in addition to this being time consuming, it is also prone to manual errors both by relying on the descriptions and the manual notes.

Code repositories may offer reports on changes made in the code commits such as validating a code-commit, checking if it passes a battery of tests, etc., but these are insufficient for the visual-based progress discussed herein. For example, they do not provide a breakdown across the multiple dimensions discussed above. Furthermore, while these reports may be useful in a static presentation, they fail to provide any information into how a project has progressed over a set period.

In view of the deficiencies above, a video-based progress tracker is described herein that automatically makes a detailed analysis of each code commit and produces one or more video frames to append to a progress video. The analysis may include determining who made the changes and how the code changes impact multiple dimensions—with each dimension having its own analysis. Therefore, in addition to generic checks, the process would involve segregating user-interface changes (e.g. for a mobile app UI change: a new UI button added, color change), performance changes (e.g. for a mobile app performance change: how much has the screen load time changed with this code-commit), and security changes (e.g., of an Android mobile app permission change: SMS permission now required to run the application), etc. Additionally, the described process may help segregate the code-commits which had an actual impact, rather than the code-commits which had no output changes (code refactoring), and help create a short and to-the-point video.

This process would parse over every code change done in a certain period, fetch the corresponding changes, run the algorithm over each change and incrementally create a video to visualize the entire spectrum of changes in the end result of a product's development. Although generally described in the context of mobile application development, the process may be used in other scenarios such as website development, backend-services, etc.

FIG. 1 is an illustration of components of a client device and an application server, according to various examples. FIG. 1 includes an application server 102, client device 104, web client 106, a code repository 108, web server 110, application logic 112, processing system 114, application programming interface (API) 116, data store 118, user accounts 120, frame generator 122, video merger 124, difference calculators 126, application development environment 128, and a code commit parser 130.

Application server 102 is illustrated as set of separate elements (e.g., generators, calculators, etc.). However, the functionality of multiple, individual elements may be performed by a single element. Similarly, although code repository 108 is illustrated as external to application server 102, code repository 108 may be part of application server 102—or elements of application server 102 may be part of code repository 108.

An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104, application server 102, and code repository 108 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In some examples, the communications may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, a RESTful API may define various GET, PUT, POST, DELETE methods to create, replace, update, and delete data stored in a database (e.g., data store 118) or commit code to code repository 108.

Application server 102 may include web server 110 to enable data exchanges with client device 104 via web client 106. Although generally discussed in the context of delivering webpages or data via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 118) in various examples.

For example, application development environment 128 may be implemented as a web application. Application development environment 128 may include several features such as providing an online programming environment for a software application—including interfacing code commits with code repository 108—testing code, application testing, team management, etc. Application development environment 128 may also provide an interface to generate and view progress videos of code commits for the software application. The features of application development environment 128 are discussed in more detail in the context of the other figure elements and following figures.

Application development environment 128 may be executed according to application logic 112. Application logic 112 may use the various elements of application server 102 to implement the features of application development environment 128. For example, application logic 112 may issue API calls to retrieve or store data (e.g., a progress video) from data store 118 and transmit it for display on client device 104. Similarly, data entered by a user into a UI component via client device 104 may be transmitted using API 116 back to application server 102. Application logic 112 may use other elements (e.g., frame generator 122, video merger 124, difference calculators 126, etc.) of application server 102 to perform functionality associated with the web application as described further herein.

Data store 118 may store data that is used by application server 102. Data store 118 is depicted as singular element but may be multiple data stores. The specific storage layout and model used in by data store 118 may take several forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

In various examples, data store 118 may be configured to store data of code repository 108. Code repository 108 may be configured as a versioning control system (e.g., Git) for software development. For example, a user may edit one or more files (e.g., source code files, header files, scripts, etc.) that are part of a software application repository. After the user edits a file(s) they may choose to commit the change to the repository—at which point the edited files are overwritten in the repository (or updated according to the differences). Any other users that are part of the team working on the application may be notified that a commit has been made, in various examples.

Metadata about the commit may also be stored. The metadata may include a user identifier of the user making the commit, a timestamp, a diff file that indicates the changes, and a label for the commit. In this manner other users (or automated processes) may be able to see, within a file itself, the changes from before and after the commit.

Data store 118 may also store a progress video data structure that is used to track data associated with a progress video. For example, a progress video data structure may include an identifier of a software application and the last time the progress video was updated.

User accounts 120 may include user profiles on users of application server 102. A user profile may include credential information such as a username and hash of a password. A user may enter in their username and plaintext password to a login page of application server 102 to view their user profile information or interfaces presented by application server 102 in various examples. A username may be associated in a database (e.g., data store 118) with one or more software application development projects.

A user account may also include preferences of the user. The preferences progress video creation defaults such as timing preferences, dimension preferences, layout preferences, and video format preferences. For example, a timing preference may indicate how long each commit should be shown (e.g., 3 seconds) in the video. Dimension preferences may be used to determine how many dimensions to display adjacent to the user interface dimension. Layout preferences may include where to show (e.g., on the right side of the user interface dimension, left side, etc.) and in what format (e.g., bar charts, columns, etc.). Video format preferences may identify a codec (e.g., H.264, H.265), bitrate, etc., for encoding the video frames. A video storage location may also be specified. For example, the storage location may be application server 102.

Figure 2:
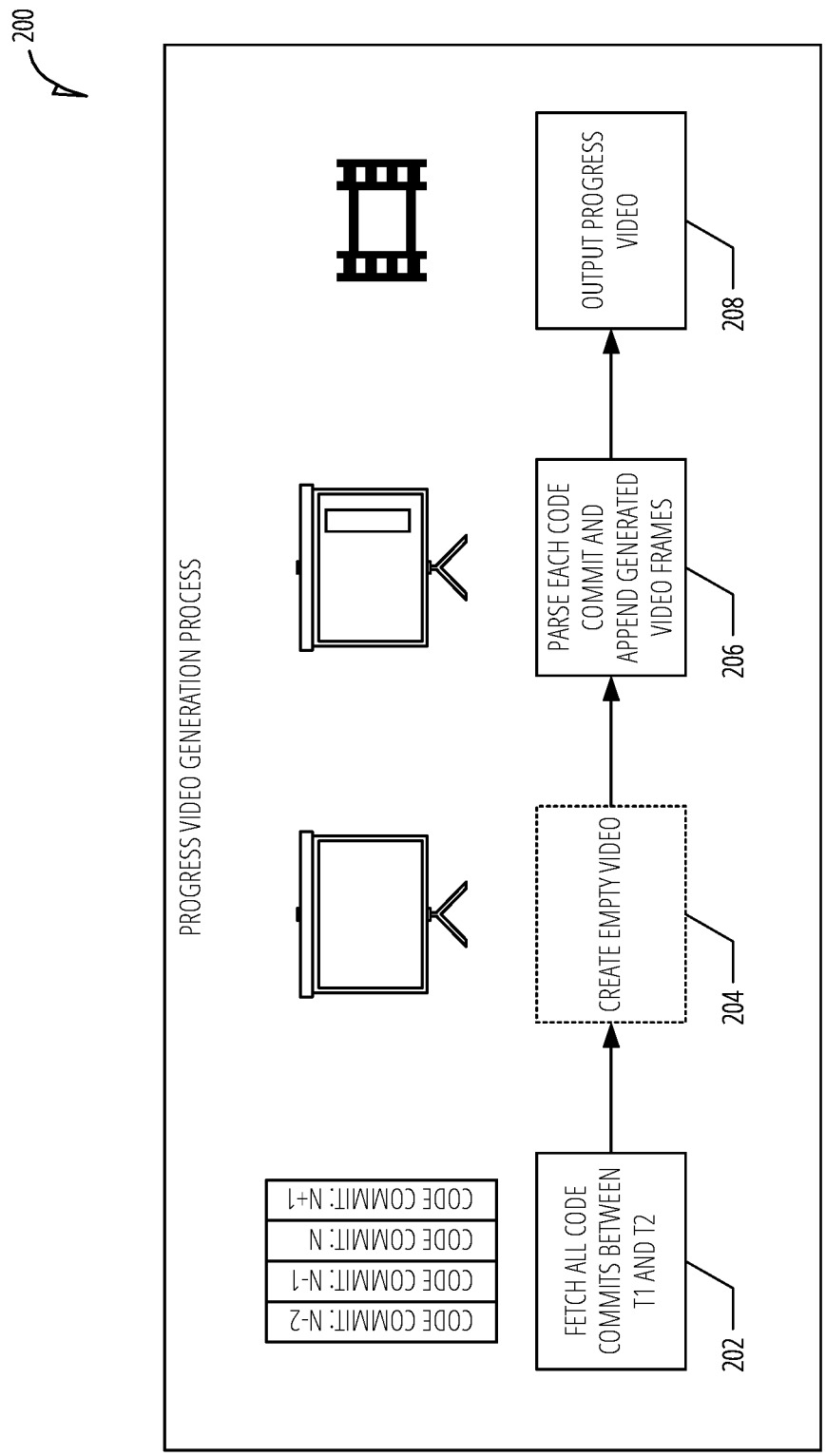
FIG. 2 is an illustration of a progress video generation process, according to various examples.
Figure 3:
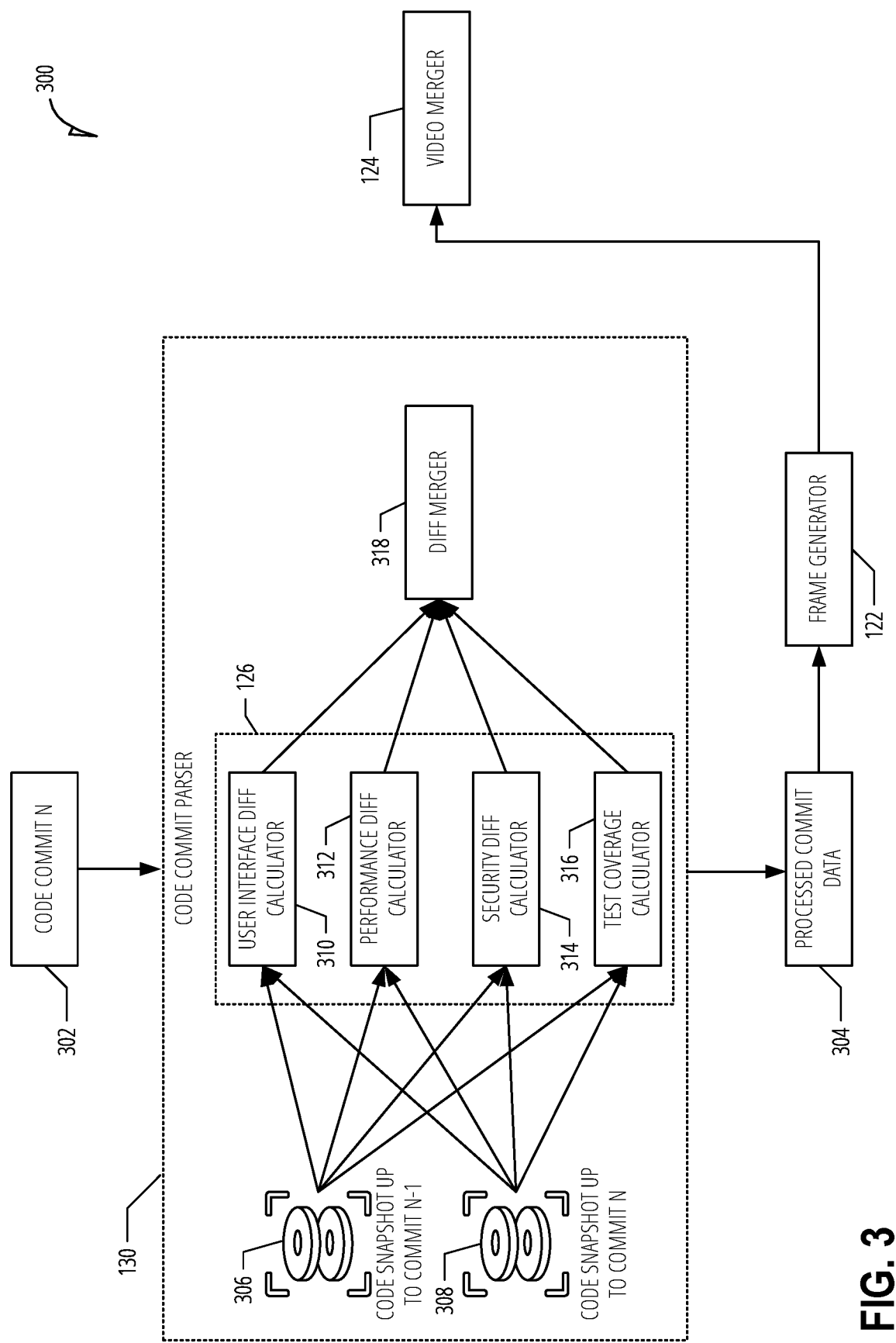
FIG. 3 is a schematic illustration of parsing a code commit, according to various examples.

Frame generator 122, video merger 124, difference calculators 126, application development environment 128, and code commit parser 130 are discussed in the context of FIG. 2 and FIG. 3.

FIG. 2 is an illustration of a progress video generation process 200, according to various examples. The process may be implemented using a system such application server 102. FIG. 2 includes fetch operation 202, creation operation 204, parse operation 206, and video output operation 208. The operations may be performed using a system, such as described in FIG. 1.

Progress video generation process 200 may begin in response to receiving a request to view a development progress video for a software application. In a first scenario, the request may originate from a user. In a second scenario, the request may be part of an automated process that periodically (e.g., weekly) updates a progress video.

With respect to the first scenario, a user interface provided by application development environment 128 may present a series of user interface elements of video generation options. The video generation options may include a start time, an end time, one or more user identifiers, and an identification of a software application. One or more of the generations may be omitted. For example, in a base scenario a user may just identify the software application. A user identifier may be used to filter the commits to those commits made by the user identifier.

At fetch operation 202, a sequence of code commits between a first time (T1) and a second time (T2) are retrieved (e.g., from code repository 108). T1 and T2 may be determined according to the video generation options and data in a progress video data structure. For example, an API call may be made using API 116 that includes an identifier of the software application. The response data from the API call may include the last time a progress video was updated according to the progress video data structure. The last time may then be used as T1. If the video generation options did not include an end time, the current time may be used as T2. Similarly, if no specific user identifier is used in the request, all commits between T1 and T2 may be retrieved. The sequence of code commits may also be filtered according to one or more user identifiers if so specified.

A check may be performed determining if a progress video for the software application has already been created-which may then be updated—or if this is the first request. If it is the first request, creation operation 204 may be used to generate an initial video and store the progress video as associated with the software application (e.g., as an entry in a progress video data structure).

At operation 206, each code commit in the sequence of code commits retrieved at operation 202 may be parsed and video frames generated and appended to the progress video. Details of operation 206 are discussed in the context of FIG. 3. After the commits have been parsed, the progress video may be outputted for viewing by a client device at operation 208.

FIG. 3 is a schematic illustration 300 of a method of parsing a code commit, according to various examples. The schematic illustration may be of operation 206 in FIG. 2, in various examples. Schematic illustration 300 includes a code commit N 302 as input to code commit parser 130. The method may be performed for each code commit in a sequence of code commits (e.g., as retrieved, and potentially filtered, in operation 202 of FIG. 2).

Code commit parser 130 includes code snapshot 306 that is based on code up to commit N−1 and code snapshot 308 that is based on code up to commit N. The snapshots may be the state (e.g., a build) of the software application at the requested commit period (N or N−1). If a build for the requested commit period does not exist, one may be generated (e.g., compiled) based on files in code repository 108 at the requested commit period.

Snapshot 306 and snapshot 308 may be compared using difference calculators 126. As illustrated, there are four calculated differences (e.g., dimensions): user interface difference calculator 310; performance difference calculator 312, security difference calculator 314, and test coverage calculator 316. Each of the calculators may take as input snapshot 306 and snapshot 308 and automatically perform respective tests to determine the differences between the two snapshots. Differences across other dimensions may be used without departing from the scope of this disclosure such as a localization (e.g., how well a build supports multiple languages) dimension and an accessibility dimension (e.g., how well a build supports accessibility tools for hearing or sight impaired users). The output of a difference calculator may be visual or alphanumerical, in various examples. For example, the output of user interface difference calculator 310 may be a screen capture whereas the output of test coverage calculator 316 may be a percentage value.

User interface difference calculator 310 may calculate how the user interface changes as a part of each commit. Some examples of the changes may be a new button added in a commit or background color changed in a commit, etc. To calculate this difference, the software application may be run on an emulator, and different visual components extracted and compared (e.g., analyzing pixel by pixel or region by region for changes in color value or using computer vision algorithms, etc.) with the visual components until the previous commit. Screen captures may then be taken from the emulator for adding the data into the video. In some examples, interface such as Android Debug Bridge (ADB) on Android may be used to implement the difference calculator when used on compatible software applications.

Performance difference calculator 312 may measure the load time for each of the visual components and compare them with the previous commit. For example, an emulator may be used to measure the screen load times with a standard set of data (e.g., the same set of data for each test). Performance difference calculator 312 may track the time it takes for a blank UI screen to change to include one or more of the visual components, according to various examples.

Security difference calculator 314 may track changes with respect to security. Some examples could be, SMS permission now required to run the application, SD card permission added to the application, etc. The permission changes may have a significant impact on the app usability or distribution going forward. To track the changes mobile application configuration files (e.g., a manifest file for Android) may be accessed and compared across commits.

Test coverage calculator 316 may be used to track the test coverage changes done as part of the commit. For example, a standard set of tests may be used so that an accurate success metric may be made across commits. If the number and types of tests changes a new baseline may be used so as to not inaccurately indicate a large increase or decrease in a success percentage.

The outputs of each of the difference calculators may be combined at difference merger 318. For example, a standardized data structure (e.g., an extensible markup language (XML) file or JavaScript Object Notation) that includes a label for each dimension and output from the difference calculator may be used. A difference calculator may have multiple outputs when multiple metrics are tracked by the difference calculator (e.g., e.g., for a test dimension there may be the number of tests and coverage of tests). The combined differences may be transmitted (e.g., using an API) as processed commit data 304 for input to frame generator 122.

Frame generator 122 may generate a video frame based on processed commit data 304. A layout for the video frame may be determined according to a template or user preferences. For example, a template may indicate the video should have a resolution of 1920×1080 with the left side of the frame including a representation of a mobile device in vertical mode, and the right side including a textual description of changes on top with bar charts of various dimensions on the bottom. The user preferences may include an order preference for the dimensions and chart type, in various examples.

Accordingly, frame generator 122 may parse processed commit data to retrieve a location of a screen capture corresponding to the output of user interface difference calculator 310 and scale and place it—e.g., using a graphics software development kit (SDK) API call-within a display portion of the mobile device representation. Similarly, an SDK may be used to draw vertically oriented rectangles on the right side of the frame according to scaled values of the output from performance difference calculator 312, security difference calculator 314, etc. For example, an output metric region may have a designated space that is 200 pixels high. Accordingly, if a metric has a possible range of values from 0-150 and is currently a 75, then a rectangle may be drawn that is 100 pixels high.

The output from the difference calculators may be enhanced if a developer chooses to add contextual tags to their code. For example, the custom tags may be applied at the beginning and end of a workflow. The workflow may be a new UI screen, a new HTTP request, etc. The tags may then help make the output video better aligned and contextual to the application being developed by using the tags therein. In an example, the tags are applied using a library called CCP (short for Code Commit Parser):

CCP.StartScreen("UserInfoForm")

. . .

CCP.EndScreen("UserInfoForm"

Video merger 124 may append the generated video frame to a progress video for the software application. For example, each frame may be stored in a folder of a data store with a sequence number. An encoding library may take as input the folder and generate a video according to a set format (e.g., H.264). In some examples, the entire video does not need to be reencoded, but rather just the newly generated frames from frame generator 122. As part of the encoding process, a preference may identify how long each frame should appear in the progress video. For example, if the progress video is encoded at 60 frames per second and the user wants each generated video frame to last two seconds, the encoder would have 120 video frames of a single frame that was generated from frame generator 122.

In various examples, a user may customize the order of output in the progress video. A user might want all UI changes to appear before all performance changes followed by accessibility changes and so on so that the output video follows a fixed order template. Because code commit parser 130 may segregate each commit's data using different diff-calculators this may be achievable by generating multiple frames for each commit—each with the output of a single difference calculator.

Figure 4:
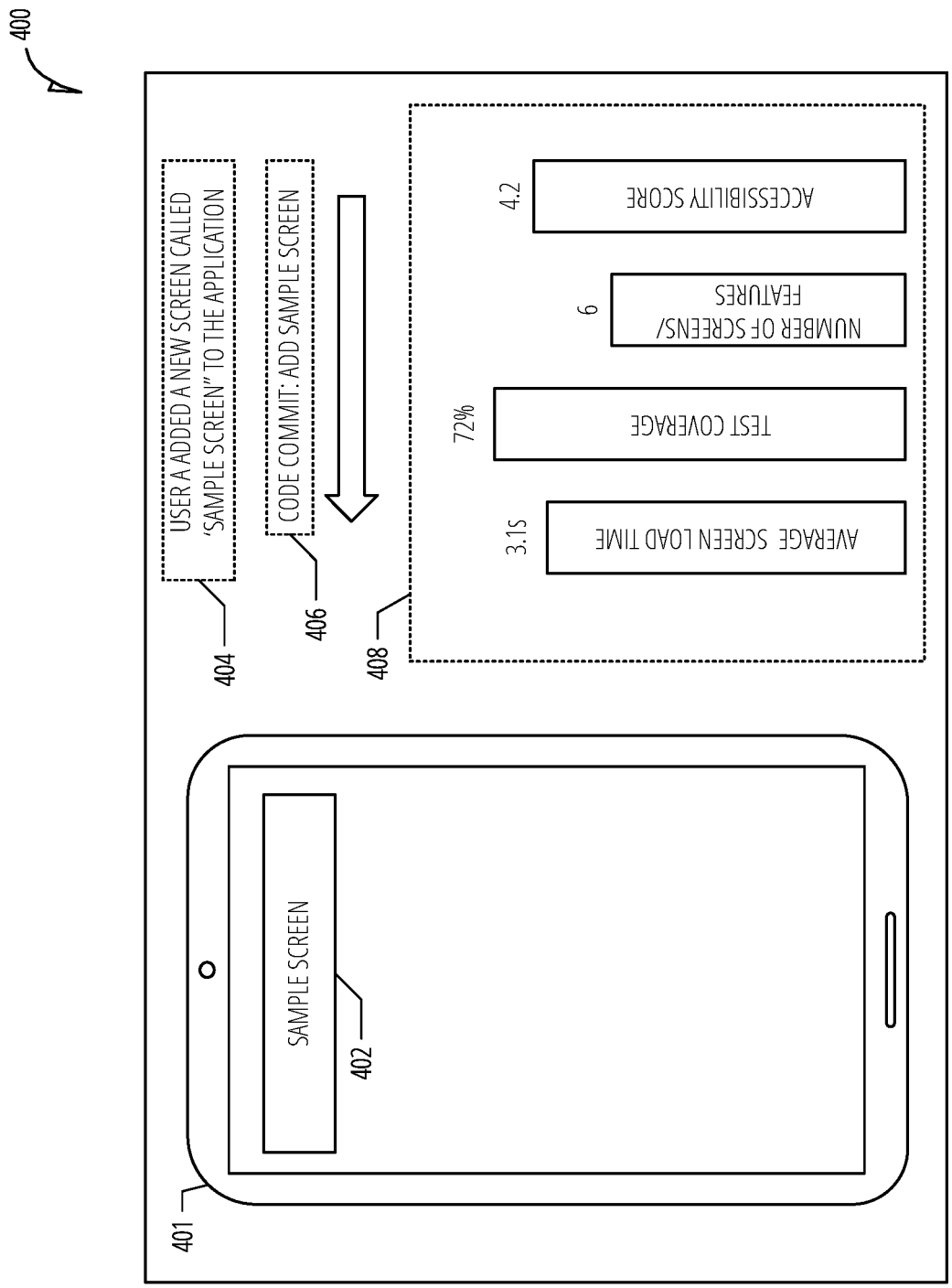
FIG. 4 is a video frame after a code commit adding a user interface element, according to various examples.

FIG. 4 is a video frame 400 after a code commit adding a user interface element, according to various examples.

Video frame 400 includes a mobile device representation 401, user interface element 402, a change description 404, a commit description 406, and dimension metrics 408. Video frame 400 (as well as the video frames of FIGS. 5-8) may have been generated using components of application server 102 such as frame generator 122.

As illustrated, video frame 400 includes several elements. On the left-hand side of the video frame includes the mobile device representation 401 (such as a tablet or mobile phone) is displayed. Within the mobile device representation 401, user interface element 402 is displayed. User interface element 402 may be part of the build of a software application at the time of the commit, as represented in video frame 400.

Change description 404 may be auto generated or retrieved as metadata with respect to a commit. For example, a templated sentence generator may be used to generate change description 404 such as "<UserID as determined by code commit>[added/removed]<UI Element Type> called <UI Element Name>". Some of the entries in the template may be determined by tags inserted into the code itself as discussed above. For example, a CCP.StartScreen("Sample Screen") tag may have been added. In other examples, a portion of the description may be from a commit description. Similarly, description 406 may be the label given to a commit by a user as stored in code repository 108.

Dimension metrics 408 may be based on the outputs from difference calculators 126 and drawn according to frame generator 122 as discussed with respect to FIG. 2. As illustrated, a label for each output is depicted within a shape graphic (e.g., the rectangles) with a value illustrated on top of the shape graphic. Other shapes and text arrangements may be used for the elements within video frame 400 without departing from the scope of this disclosure.

Figure 5:
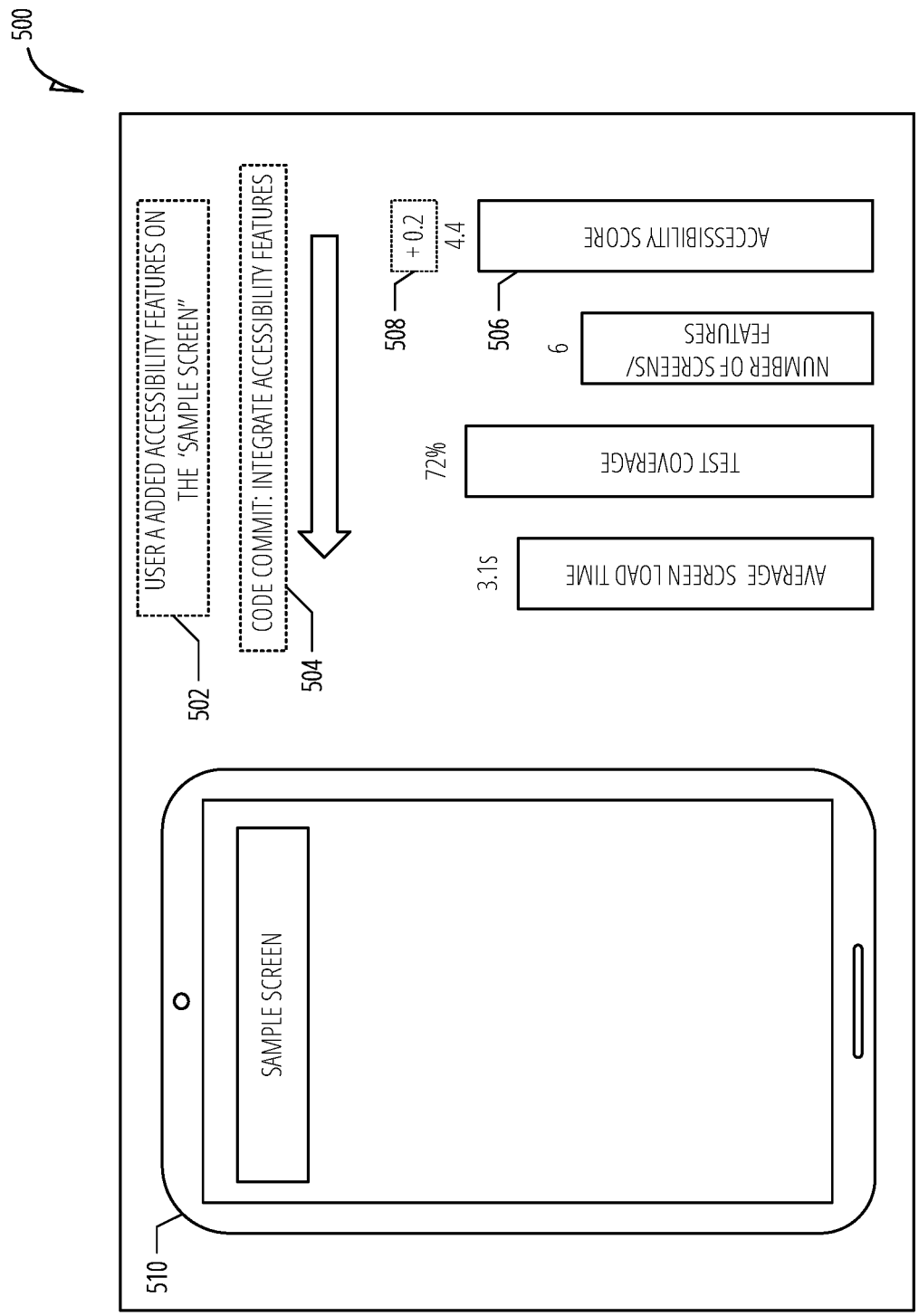
FIG. 5 is a video frame after a code commit adding accessibility features, according to various examples.

FIG. 5 is a video frame 500 after a code commit adding accessibility features, according to various examples. Video frame 500 may be the next generated frame of a video progress video that includes video frame 400. As indicated above, a generated frame may be repeated several times within the video progress video itself. Video frame 500 includes mobile device representation 510. As illustrated, the user interface within this representation is unchanged from video frame 400. Instead, a change description 502 indicates that accessibility features were added to the sample screen, which may be based on tags added to the code. This is further reflected in a commit description 504 that indicates accessibility features were integrated.

Video frame 500 further includes accessibility score graphic 506 and a delta value 508. As compared to video frame 400, accessibility score graphic 506 has a value of 4.4 (and is slightly taller) instead of 4.2. This difference is reflected as a "+0.2" in delta value 508. If a user is viewing the progress video they may not readily notice the change in height of the accessibility score graphic from video frame 400, but likely will notice the addition of delta value 508.

Figure 6:
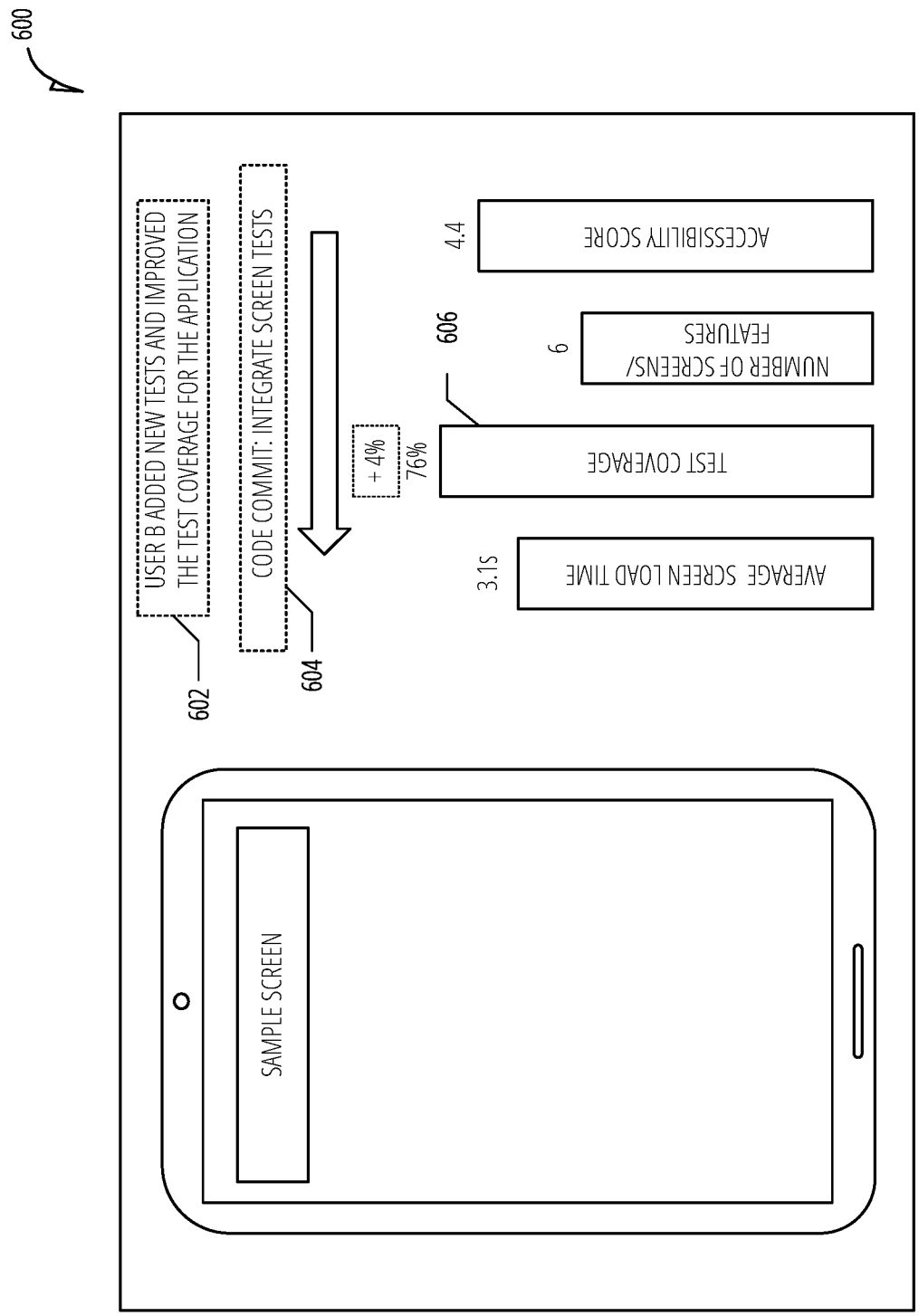
FIG. 6 is a video frame after a code commit adding new test coverage for an application, according to various examples.

FIG. 6 is a video frame 600 after a code commit adding new test coverage for an application, according to various examples. Video frame 600 may be the next generated frame of a video progress video that includes video frame 500. Change description 602 indicates that user B has added new tests and improved the test coverage for the application with commit description 604 indicating that screen tests were integrated.

Generation of change description 602 may be based on a concatenation of two sentence templates. For example, the "user be added new tests" portion may be based on tag commits within the code, and the "improved the test coverage for the application" may be generated based on the test coverage score having gone up from the previous commit. Thus, if the test coverage score had gone down, the description template may use "worsened the test coverage for the application." Furthermore, as with video frame 500, the height of one of the score graphics, in this case test coverage graphic 606, has been increased to indicate the change in test coverage performance to 76%.

Figure 7:
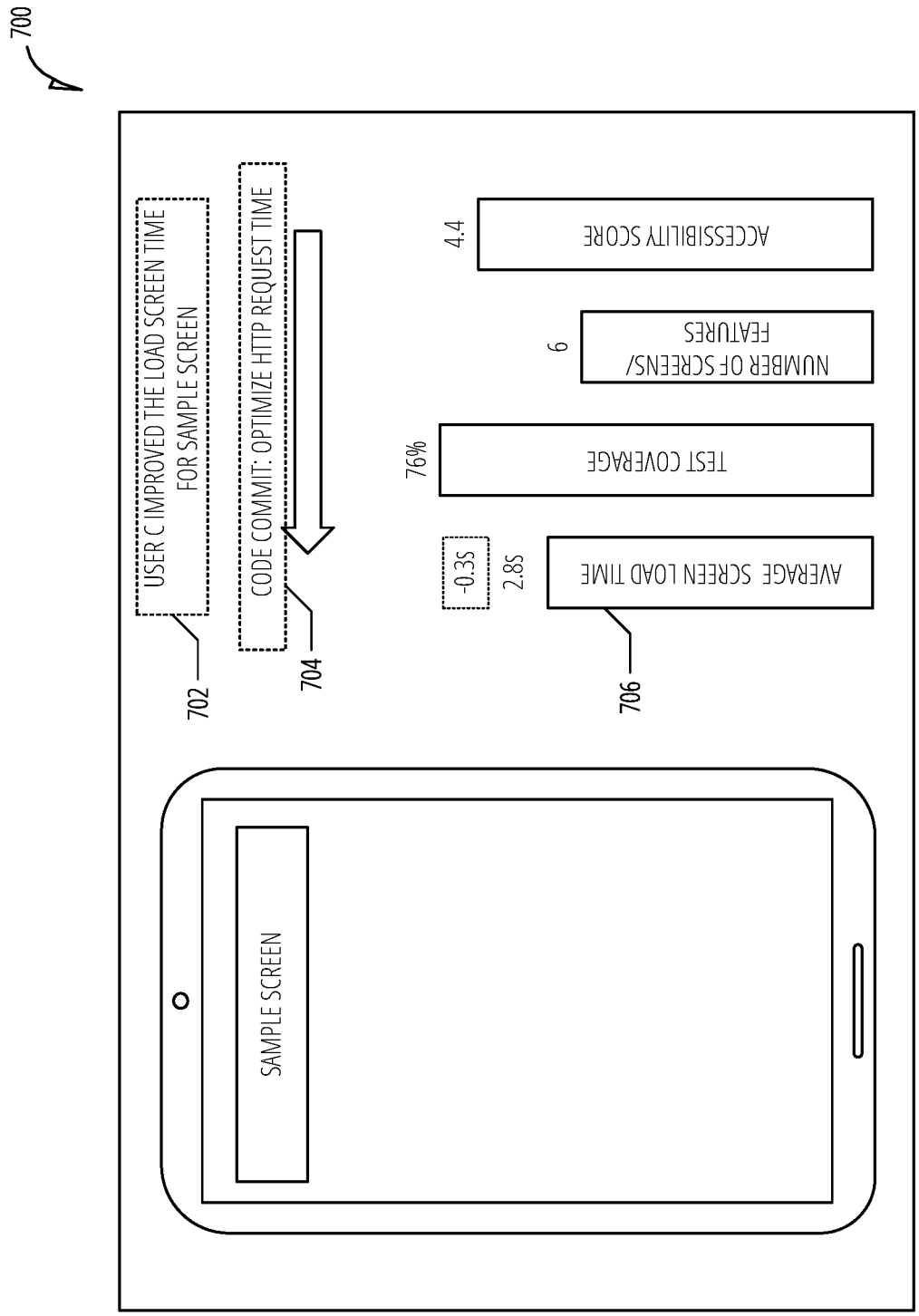
FIG. 7 is a video frame after a code commit improving load times, according to various examples.

FIG. 7 is a video frame 700 after a code commit improving load times, according to various examples. Video frame 700 may be the next generated frame of a video progress video that includes video frame 600. Video frame 700 illustrates a decrease in the screen load time based on changes made by user C, as reflected in change description 702 and further elaborated on in commit description 704. Screen load time graphic 706 has been shrunk in the vertical direction compared to video frame 600 to reflect the lower load time.

Figure 8:
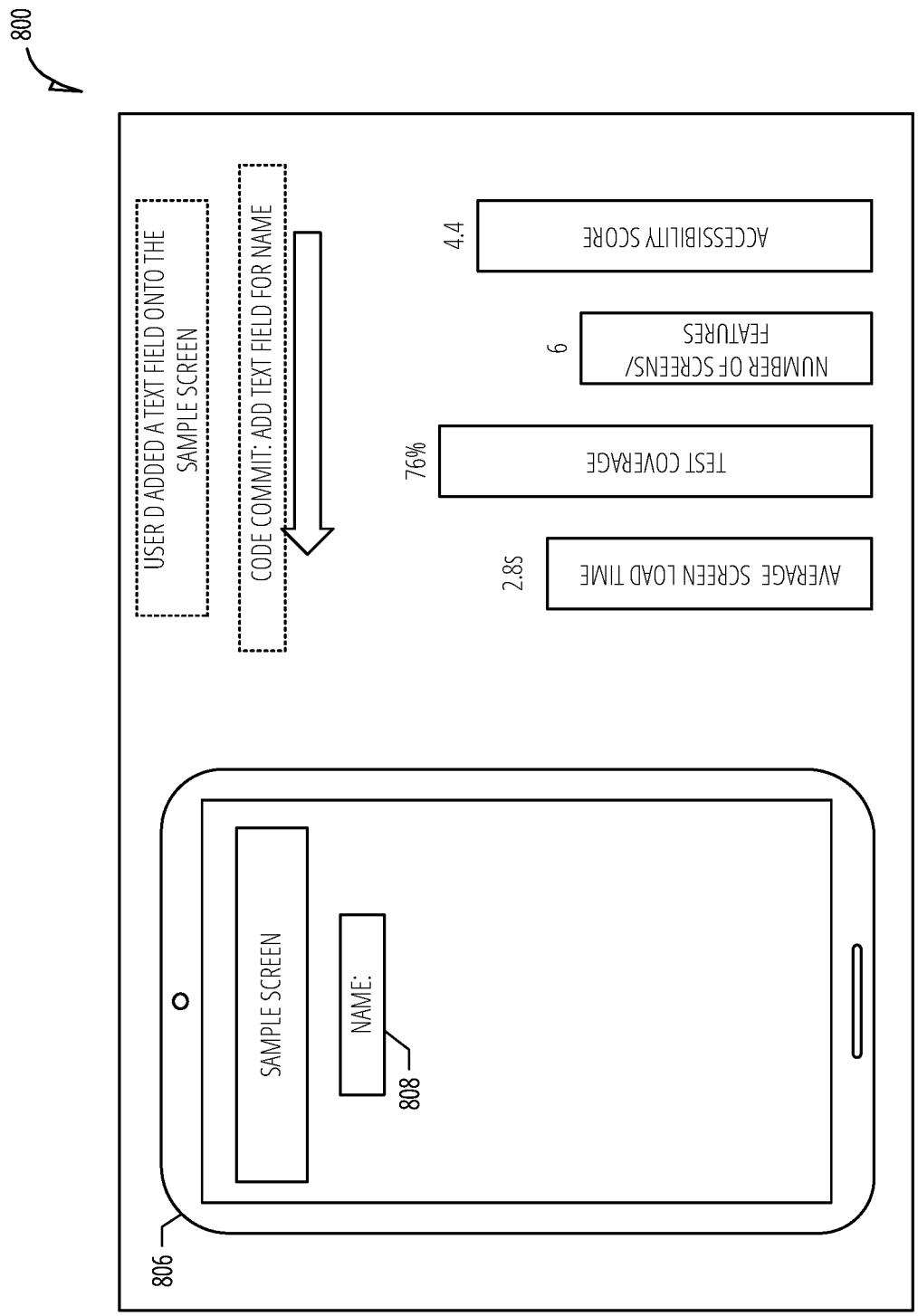
FIG. 8 is a video frame after a code commit adding a text field user interface element, according to various examples.

FIG. 8 is a video frame 800 after a code commit adding a text field user interface element, according to various examples. Video frame 800 may be the next generated frame of a video progress video that includes video frame 700. Video frame 800 illustrates the addition of a new user interface element. As reflected in a mobile device representation 806, a text field 808 with the label "Name:" has been added.

Figure 9:
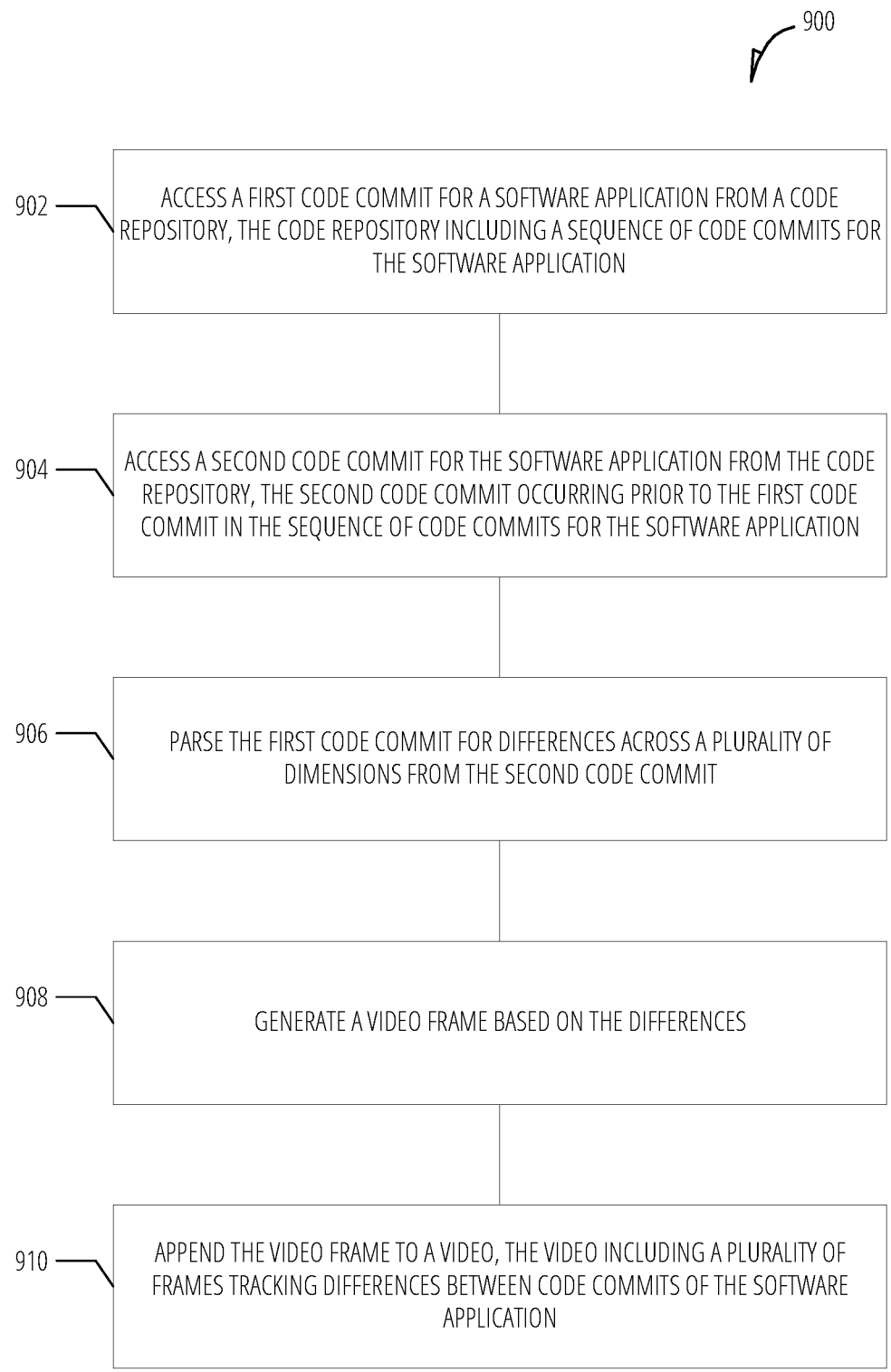
FIG. 9 is a flowchart illustrating a method to generate a video frame of a video-based progress tracking video for mobile application development, according to various examples.

FIG. 9 is a flowchart illustrating a method to generate a video frame of a video-based progress tracking video for mobile application development, according to various examples. The method is represented as a set of blocks that describe operation 902 to operation 910 of flowchart 900. The method may be implemented using the elements described with respect to FIG. 1, FIG. 2, and FIG. 3 in various examples The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 9. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 902, in various examples, the method may include accessing a first code commit for a software application from a code repository (e.g., code repository 108). The code repository may include a sequence of code commits for the software application. Each of the code commits may have an associated user identifier that identifies the user that made the commit and a commit label.

At operation 904, in various examples, the method may include accessing a second code commit for the software application from the code repository. In an example, the second code commit occurring prior to the first code commit in the sequence of code commits for the software application. In some examples, the second code commit may immediately precede the first code commit in the sequence of code commits as stored at the code repository.

The first and second commits may be determined according to a request from a user (e.g., fetch operation 202). For example, a time of the first commit may be the current time and a time of the second commit may be when user last requested a progress video. Furthermore, not all of the commits in the sequence of commits may be retrieved. For example, if the user only wants to view changes made by User A, the second commit may not be the most recent commit in the sequence of commits. Instead, the first commit may be the last commit made by User A. Similarly, the second commit may not be the commit immediately preceding the first commit, but instead may be the commit made by User A prior to the first commit.

At operation 906, in various examples, the method may include parsing the first code commit for differences across a plurality of dimensions from the second code commit. The parsing may be performed as discussed with respect to code commit parser 130 and FIG. 3, according to various examples. In various examples, the differences may be determined for a user interface dimension and a performance dimension.

In various examples, parsing may include parsing the first code commit for tags that label a portion of code and wherein generating the video frame (operation 908) includes placing the label in the generated video frame.

At operation 908, in various examples, the method may include generating a video frame based on the differences. Generating the video may be performed as discussed above with respect to frame generator 122. With respect to the user interface dimension, generating the video frame may include placing, in a first portion of the video frame, a representation of a user interface of the software application as of the first code commit (e.g., within a device representation such as mobile device representation 401 and placing, in a second portion of the video frame, a representation of a performance metric associated with the performance dimension as of the first code commit (e.g., within a dimension portion such as dimension metrics 408.

For example, with respect to the user interface dimension, the method may include emulating visual components of the user interface at a time of the first code commit and emulating visual components of the user interface at a time of the second code commit. Then, the representation of the user interface may based on a comparison of a screen capture of the emulated visual components of the user interface at the time of the first code commit and the emulated visual components of the user interface at the time of the second code commit. If a user interface element is added, the representation may highlight the addition (e.g., outlining or bolding). If a user interface element is removed, the representation may deemphasis the element by making it gray, outlining it with a dotted line, etc.

In various examples, generating the performance metric may be based on a measurement of load times for visual components of the user interface in the first code commit compared to a measurement of load times for visual components of the user interface in the second code commit as discussed with respect to performance difference calculator 312.

In various examples, the plurality of dimensions may include a security dimension. Generating the video frame based on the differences may include placing in the second portion of the video frame, a representation of a security metric (e.g., as based on security difference calculator 314) associated with the security dimension as of the first code commit. The metric may include the number of permissions required for a user to use the software application.

At operation 910, in various examples, the method may include appending the video frame to a video, the video including a plurality of frames tracking differences between code commits of the software application. Appending the frame may be performed as discussed with respect to video merger 124, according to various examples.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium.

In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
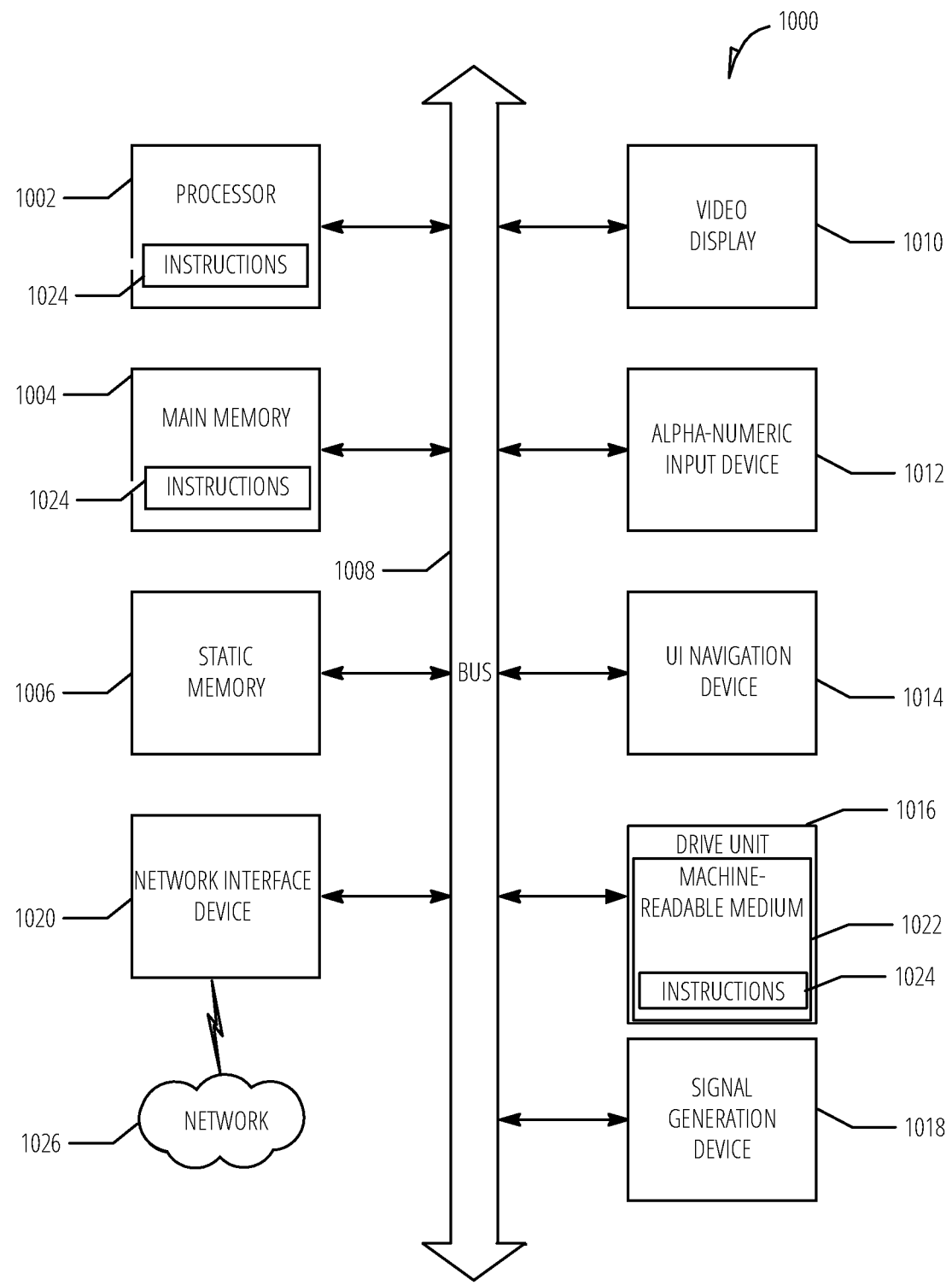
FIG. 10 is a block diagram illustrating an example machine upon which any one or more of the techniques (e.g., methodologies) discussed herein may be performed, according to various examples.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the at least one processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
    at least one processor; and
    a storage device comprising instructions, which when executed by the at least one processor, configure the at least one processor to perform operations comprising:
    accessing a first code commit for a software application from a code repository, the code repository including a sequence of code commits for the software application;
    accessing a second code commit for the software application from the code repository, the second code commit occurring prior to the first code commit in the sequence of code commits for the software application;
    parsing the first code commit for differences across a plurality of dimensions from the second code commit, wherein the plurality of dimensions includes at least user interface changes performance enhancements, security updates, and test coverage improvements;
    generating a video frame based on the differences, wherein the video frame visually distinguishes the differences across the plurality of dimensions using distinct visual indicators for each dimension; and
    appending the video frame to a video, the video including a plurality of frames tracking differences between code commits of the software application, wherein the video provides a chronological visualization of the development of the software application highlighting the evolution of the plurality of dimensions.

2. The system of claim 1, wherein the plurality of dimensions includes a user interface dimension and a performance dimension.

3. The system of claim 2, wherein the operation of generating the video frame based on the differences includes:
    placing, in a first portion of the video frame, a representation of a user interface of the software application as of the first code commit; and placing, in a second portion of the video frame, a representation of a performance metric associated with the performance dimension as of the first code commit.

4. The system of claim 3, wherein the storage device comprises further instructions, which when executed by the at least one processor, configure the at least one processor to perform operations comprising:

generating the performance metric based on a measurement of load times for visual components of the user interface in the first code commit compared to a measurement of load times for visual components of the user interface in the second code commit.

5. The system of claim 3, wherein the storage device comprises further instructions, which when executed by the at least one processor, configure the at least one processor to perform operations comprising:

emulating visual components of the user interface at a time of the first code commit;

emulating visual components of the user interface at a time of the second code commit; and generating the representation of the user interface based on a comparison of a screen capture of the emulated visual components of the user interface at the time of the first code commit and the emulated visual components of the user interface at the time of the second code commit.

6. The system of claim 3, wherein the plurality of dimensions includes a security dimension and wherein the operation of generating the video frame based on the differences further includes:

placing in the second portion of the video frame, a representation of a security metric associated with the security dimension as of the first code commit.

7. The system of claim 1, wherein the operation of parsing the first code commit for differences across the plurality of dimensions from the second code commit includes:

parsing the first code commit for tags that label a portion of code; and wherein generating the video frame includes placing the label in the video frame.

8. The system of claim 1, wherein the second code commit occurs immediately prior to the first code commit in the sequence of code commits.

9. The system of claim 1, wherein the storage device comprises further instructions, which when executed by the at least one processor, configure the at least one processor to perform operations comprising:

receiving a user identification, the user identification associated with a plurality of code commits in the sequence of code commits; and wherein the second code commit was committed to the code repository by a user with the user identification and the first code commit was committed to the code repository by the user with the user identification with no code commits by the user with the user identification between the first code commit and second code commit.

10. A computer-implemented method comprising:

accessing a first code commit for a software application from a code repository, the code repository including a sequence of code commits for the software application;

accessing a second code commit for the software application from the code repository, the second code commit occurring prior to the first code commit in the sequence of code commits for the software application;

parsing the first code commit for differences across a plurality of dimensions from the second code commit wherein the plurality of dimensions includes at least user interface changes performance enhancements, security updates, and test coverage improvements;

generating a video frame based on the differences, wherein the video frame visually distinguishes the differences across the plurality of dimensions using distinct visual indicators for each dimension; and appending the video frame to a video, the video including a plurality of frames tracking differences between code commits of the software application, wherein the video provides a chronological visualization of the development of the software application highlighting the evolution of the plurality of dimensions.

11. The computer-implemented method of claim 10, wherein the plurality of dimensions includes a user interface dimension and a performance dimension.

12. The computer-implemented method of claim 11, wherein generating the video frame based on the differences includes:

placing, in a first portion of the video frame, a representation of a user interface of the software application as of the first code commit; and placing, in a second portion of the video frame, a representation of a performance metric associated with the performance dimension as of the first code commit.

13. The computer-implemented method of claim 12, further comprising:

generating the performance metric based on a measurement of load times for visual components of the user interface in the first code commit compared to a measurement of load times for visual components of the user interface in the second code commit.

14. The computer-implemented method of claim 12, further comprising:

emulating visual components of the user interface at a time of the first code commit;

emulating visual components of the user interface at a time of the second code commit; and generating the representation of the user interface based on a comparison of a screen capture of the emulated visual components of the user interface at the time of the first code commit and the emulated visual components of the user interface at the time of the second code commit.

15. The computer-implemented method of claim 12, wherein the plurality of dimensions includes a security dimension and wherein generating the video frame based on the differences further includes:

placing in the second portion of the video frame, a representation of a security metric associated with the security dimension as of the first code commit.

16. The computer-implemented method of claim 10, wherein parsing the first code commit for differences across the plurality of dimensions from the second code commit includes:

parsing the first code commit for tags that label a portion of code; and wherein generating the video frame includes placing the label in the video frame.

17. The computer-implemented method of claim 10, wherein the second code commit occurs immediately prior to the first code commit in the sequence of code commits.

18. The computer-implemented method of claim 10, further comprising:

receiving a user identification, the user identification associated with a plurality of code commits in the sequence of code commits; and wherein the second code commit was committed to the code repository by a user with the user identification and the first code commit was committed to the code repository by the user with the user identification with no code commits by the user with the user identification between the first code commit and second code commit.

19. A storage device comprising instructions, which when executed by at least one processor, configure the at least one processor to perform operations comprising:

accessing a first code commit for a software application from a code repository, the code repository including a sequence of code commits for the software application;

accessing a second code commit for the software application from the code repository, the second code commit occurring prior to the first code commit in the sequence of code commits for the software application;

parsing the first code commit for differences across a plurality of dimensions from the second code commit wherein the plurality of dimensions includes at least user interface changes, performance enhancements, security updates, and test coverage improvements;

generating a video frame based on the differences, wherein the video frame visually distinguishes the differences across the plurality of dimensions using distinct visual indicators for each dimension; and appending the video frame to a video, the video including a plurality of frames tracking differences between code commits of the software application, wherein the video provides a chronological visualization of the development of the software application highlighting the evolution of the plurality of dimensions.

20. The storage device of claim 19, wherein the plurality of dimensions includes a user interface dimension and a performance dimension.

\* \* \* \* \*